(12) United States Patent
Filev et al.

(10) Patent No.: US 9,516,366 B2
(45) Date of Patent: *Dec. 6, 2016

(54) DETERMINING USER ENGAGEMENT WITH MEDIA CONTENT VIA MOBILE DEVICE USAGE

(71) Applicant: GOOGLE INC., Mountain View, CA (US)

(72) Inventors: Momchil Filev, Mountain View, CA (US); Martin Freund, Mountain View, CA (US)

(73) Assignee: GOOGLE INC., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/942,689

(22) Filed: Nov. 16, 2015

(65) Prior Publication Data

US 2016/0073143 A1 Mar. 10, 2016

Related U.S. Application Data

(63) Continuation of application No. 13/728,993, filed on Dec. 27, 2012, now Pat. No. 9,219,790.

(60) Provisional application No. 61/666,706, filed on Jun. 29, 2012.

(51) Int. Cl.
| | |
|---|---|
| *G06F 15/173* | (2006.01) |
| *H04N 21/258* | (2011.01) |
| *H04L 29/08* | (2006.01) |
| *G06Q 30/02* | (2012.01) |
| *H04N 21/2668* | (2011.01) |
| *H04N 21/41* | (2011.01) |
| *H04N 21/442* | (2011.01) |
| *H04N 21/81* | (2011.01) |
| *H04L 21/00* | (2006.01) |
| *H04W 4/00* | (2009.01) |

(52) U.S. Cl.
CPC .... *H04N 21/25866* (2013.01); *G06Q 30/0255* (2013.01); *H04L 21/00* (2013.01); *H04L 67/18* (2013.01); *H04L 67/22* (2013.01); *H04L 67/2833* (2013.01); *H04N 21/2668* (2013.01); *H04N 21/4126* (2013.01); *H04N 21/44218* (2013.01); *H04N 21/812* (2013.01); *H04W 4/00* (2013.01)

(58) Field of Classification Search
USPC ................................ 709/202, 223, 224, 226
See application file for complete search history.

(56) References Cited

U.S. PATENT DOCUMENTS

| | | | | |
|---|---|---|---|---|
| 8,635,255 | B2 * | 1/2014 | Roberts | G06F 17/30029 707/805 |
| 9,219,790 | B1 * | 12/2015 | Filev | H04L 67/22 |
| 9,288,431 | B2 * | 3/2016 | Tang | H04N 5/85 |
| 2009/0133078 | A1 * | 5/2009 | Hamano | H04N 5/76 725/87 |
| 2009/0299843 | A1 * | 12/2009 | Shkedi | G06Q 30/02 705/14.25 |
| 2012/0197734 | A1 * | 8/2012 | DeLuca | G06Q 30/0269 705/14.66 |

* cited by examiner

*Primary Examiner* — Liangche A Wang
(74) *Attorney, Agent, or Firm* — Morgan, Lewis & Bockius LLP

(57) ABSTRACT

The various embodiments described herein include methods and systems for determining user engagement with media content. In one aspect, a method is performed at a server system. The method includes: (1) receiving, from a first device configured to control presentation of media content, media content identification information for media content presented during a time period; (2) receiving mobile device usage information from a second device in proximity to the first device, the second device associated with a user and the usage information corresponding to mobile device usage of the user during the time period; (3) based on the usage information and the identification information, determining a level of engagement of the user with the presented media content; and (4) if the level of engagement meets one or more predefined criterion, recommending additional media content to the user and/or targeting advertisements at the user based on the presented media content.

20 Claims, 7 Drawing Sheets

DETERMINING USER ENGAGEMENT WITH MEDIA CONTENT VIA MOBILE DEVICE USAGE

RELATED APPLICATIONS

This application is a continuation of U.S. application Ser. No. 13/728,993, filed Dec. 27, 2012, entitled "Determining User Engagement With Presented Media Content Through Mobile Device Usage," which itself claims priority to U.S. Provisional Patent Application No. 61/666,706, filed Jun. 29, 2012, entitled "Determining User Engagement With Presented Media Content Through Mobile Device Usage," both of which are hereby expressly incorporated by reference in their entirety.

TECHNICAL FIELD

The disclosed implementations relate to the field of presenting media content generally and in particular to determining a user's interest in presented media.

BACKGROUND

There are currently many avenues for users to consume media content. In addition to traditional, non-interactive avenues such traditional television, radio, or projection screens in movie theatres, new electronic devices provide additional avenues to consume media content, such as streaming content over the Internet via computers, smart phones, or tablets. Many of these avenues for consuming media content are primarily supported by advertising revenues. However, for potential advertisers, determining the impact of particular advertisements can be difficult to determine. Additionally, producers of media content have interest in determining consumer's reactions to the media content they produce.

A factor that increases the difficulty of measuring the impact of specific media content are the second screen devices that are commonly used by consumers of media content. Many users will consume media content while having easy access to a smart phone, a tablet computer, a laptop or another electronic device. Thus, it is possible for a user to be in the vicinity of presented media content and not be engaged with the presented media at all.

The new avenues for consuming media content also provide additional opportunities for users to interact with the content providers and have access to personalized services. One option for producers or distributors of media content to provide personalized services is through a recommendation engine. Such engines select new media content to recommend to the user based on information known about a user. Increasing the amount of information that a recommendation engine has concerning a specific user increases the accuracy of recommendation engine to correctly recommend media content that the user will find interesting. As a result, gathering information concerning what media content a user finds engaging and what media content a user does not find interesting is important to providing a good user experience.

SUMMARY

Systems, mobile electronic devices, methods, and non-transitory computer readable storage mediums for determining user engagement with presented media content through mobile device usage are hereby disclosed.

In one aspect, a method for determining user engagement with displayed media content includes: at a server system having one or more processors and memory storing one or more programs for execution by the one or more processors, receiving media content identification information from a first electronic device configured to control presentation of media content, receiving mobile device usage information from a second electronic device, which is associated with a user in proximity to the first electronic device, determining based on the media content identification information, media content presented at the first device, associating the determined media content and the mobile device usage information, and, based on correspondence between the associated received mobile device usage information and the media content identification information, estimating user engagement of the user with the presented media content. In some implementations, the presented media content includes television programs and advertisements.

In some implementations, the method further includes: based on the correspondence between the associated received mobile device usage information and the media content identification information, generating a personalized user interest profile. In some implementations, the method optionally includes: based on the generated user interest profile, determining media content for recommendation to the user associated with the generated user interest profile.

In some implementations, the media content identification information includes channel information, location information, and time information.

In some implementations, determining media content includes: accessing a database of media content related information using the received media content identification information to receive additional information associated with the media content.

In some implementations, the received media content information identifies specific media content currently presented at the first electronic device.

In some implementations, the method further includes: determining a user in the vicinity of the first electronic device.

In some implementations, the mobile device use information includes information on what applications the user of the mobile device uses, when the applications are used, and how the applications are used.

In other implementations, the mobile device usage information includes a log of actions performed by the user on the second device. In some implementations, the specific user actions include: opening an application, closing an application, turning on the device, turning off the device, search requests, and specific actions within applications.

In some implementations, estimating user engagement with specific media content further includes: based on the media content identification information, identifying a specific piece of media content being presented at the first electronic device during a first time; identifying mobile device use information for actions by the user during the first time; and analyzing specific user actions during the first time to estimate user engagement with the specific piece of media content.

In another aspect, a method for determining user engagement with displayed media content includes: receiving media content identification information from a first electronic device configured to control presentation of media content; receiving mobile device usage information from a second electronic device, wherein the second electronic device is associated with a user in the vicinity of the first electronic device; determining, based on the media content identification information, media content presented at the first device; associating the determined media content and the mobile device usage information; and aggregating data from a plurality of users by adding the determined media content information and mobile device usage information into a large collection of aggregated data from the plurality of users.

In addition, a computer system (e.g., a server system) and a non-transitory computer readable storage medium storing one or more programs, which when executed by a computer, cause the computer to perform one or more steps of the above-described methods are also disclosed.

In still another aspect, a method for determining user engagement with displayed media, comprising: at a mobile electronic device, determining media content being displayed in the vicinity of the mobile device; collecting mobile device usage information for the mobile electronic device; and transmitting, to a server system, information identifying the determined media content and the collected mobile device usage information. In some implementations, the server system is located remotely from the mobile device.

In some implementations, determining media content being displayed in the vicinity of the mobile device includes: receiving audio input from a microphone associated with the mobile electronic device; and determining, based on received audio input, a specific piece of media content presented in the vicinity of the mobile electronic device. In some implementations, determining a specific piece of media content further includes: analyzing the received audio input to detect an audio watermark that identifies a particular piece of media. In other implementations, determining a specific piece of media content further includes: analyzing the received audio input to determine audio fingerprint; and determining a specific piece of media content based on the audio fingerprint.

In some implementations, the audio input is an audio snippet that is used to determine the specific piece of media content.

In addition, a mobile electronic device (e.g., a client device) and a non-transitory computer readable storage medium storing one or more programs, which when executed by a computer, cause the computer to perform one or more steps of the above-described methods are also disclosed.

BRIEF DESCRIPTION OF THE DRAWINGS

Like reference numerals refer to corresponding parts throughout the drawings.

DESCRIPTION OF IMPLEMENTATIONS

Figure 1:
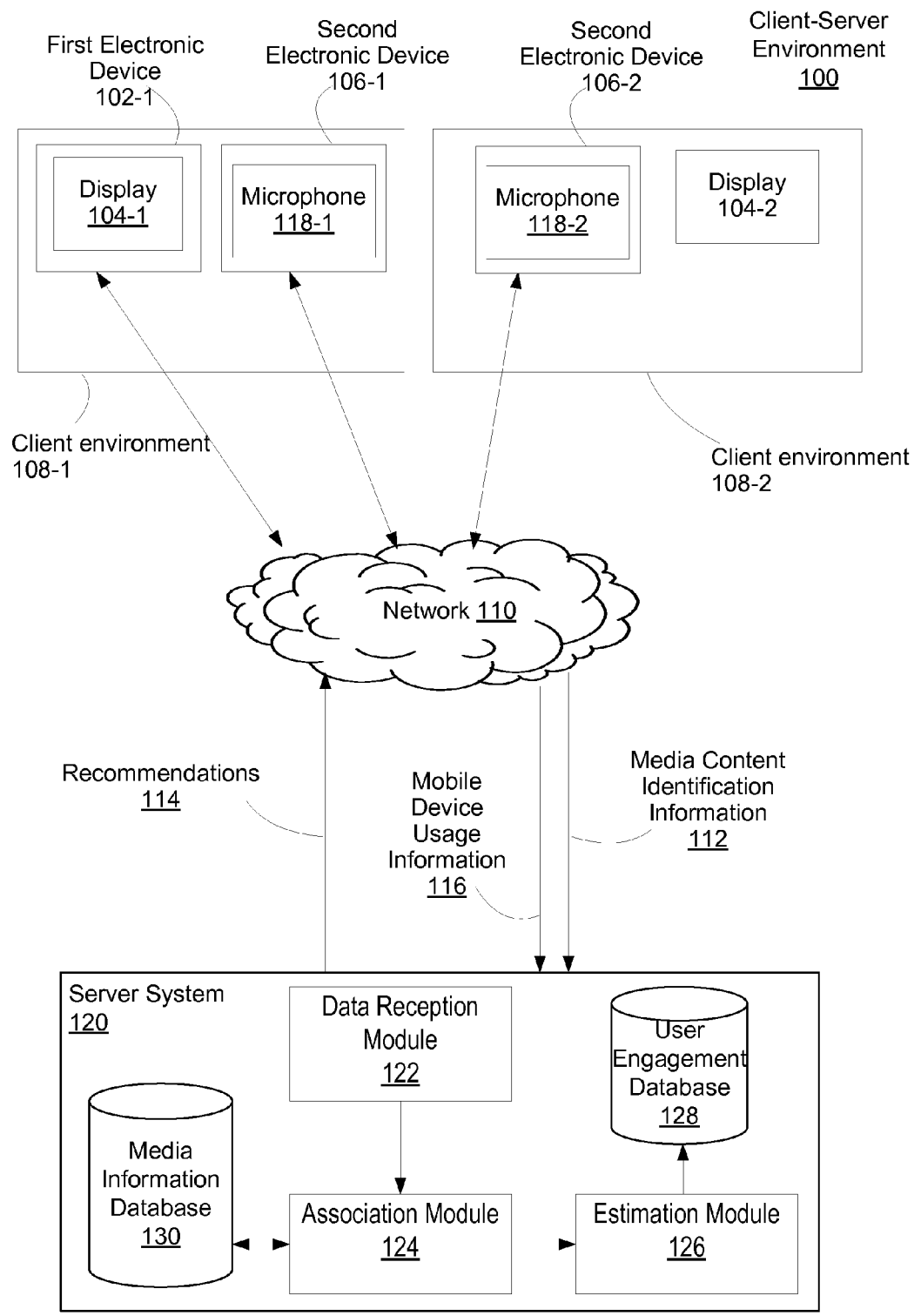
FIG. 1 is a block diagram illustrating a client-server environment in accordance with some implementations.

In some implementations, a server system collects data from a variety of sources to determine user engagement with a presented media. In some implementations, the server system receives content identification information for media content being presented at an electronic device located remotely from the server system. A variety of different types of media content can be presented at a first electronic device. In some implementations the media content identified by the content identification information includes television programs, advertisements, music videos, movies, or Internet videos. For example, a set top box connected to a television and the Internet sends the time, the channel currently displayed, and the location of the television to the server system. The server system can use this information to access a database of television program data to determine exactly what television program or commercial was being presented at the received time. In other cases, the set top box sends a television program identification code transmitted with the content, which uniquely identifies the particular piece of media being displayed. In some implementations, the set top box transmits a small amount of video or audio data, or fingerprints of either type of data, to the server, which uses this information to determine the correct media content based on comparing the transmitted information to digital fingerprints of known content. In some implementations, the video or audio snippets may also include distinctive digital watermarks inserted in the media content prior to its broadcast, which enable to server to identify the content being played.

In accordance with some implementations, the server system also receives mobile device usage information from a second electronic device (either directly or via a set top box or connected TV paired with the second electronic device). Before collecting and sending this data the server system receives approval from the user of the first and second device to collect and send this data. The user is also given periodic reminders that the data is being collected and an option to opt out of future data collection. In some implementations, the second electronic device is a mobile device, such as a smart phone, tablet, media player, or laptop computer. The second electronic device is associated with a user determined to be in the vicinity of the first electronic device. Determining a user in the vicinity of an electronic device can be accomplished in several ways. In some implementations, it is possible to determine a user who is logged-on to the first electronic device (e.g., a user signed on to a Google account via a Google-TV enabled device). As long as the user's last interaction with the first electronic device was within a predetermined amount of time, the system is able to assume the user is still in the vicinity of the first electronic device. Once the time since the last user interaction with the first electronic device exceeds the predetermined limit, the server system determines that the user is no longer in the proximity of the electronic device. For example, if a user is logged onto a media display device, the server system will determine that they are still in the vicinity of the electronic device as long as the user has interacted with the first electronic device within 5 minutes (e.g., by changing channels, adjusting the volume, or adjusting any number of device settings).

In some implementations, the server system is able to use the GPS function of a mobile device of a user to determine whether the user is in the vicinity of the first electronic device. Additionally, in some implementations, the first electronic device uses a local area network, Wi-Fi, or another wireless peer-to-peer communication method (such as Bluetooth) to determine if there are any mobile devices in the vicinity of the first electronic device. If a device is detected the server system then determines a user associated with the detected device. For example, Bluetooth pairing between the first and second devices can be used to confirm that the two devices are in proximity to one another. In some implementations, the second device itself uses a built-in microphone to receive audio input. The second device then uses this audio input to determine the media content being presented in the vicinity of the second device to confirm that the second device is in proximity to the first electronic device. In some implementations the server determines a first electronic device and a second electronic device are within the same area if the same user account is logged into and active on both devices.

In some implementations, the server system receives mobile device usage information. The mobile device usage information includes a log of actions performed by the user on the second device. Actions recorded in the log of actions include but are not limited to opening an application, closing an application, turning on the device, turning off the device, search requests, and specific actions within applications. For example, the mobile device usage information indicates that the user turned the device on at a certain time, opened up a game, and then played the game for 12 minutes until no more input is detected and the mobile device goes into sleep mode. Each action recorded in the log can be classified as a positive indicator of engagement, a negative indicator of engagement, or a neutral indicator of engagement. For example, a mobile game is almost always a negative indicator because it requires the focus of the user and is unlikely to be related to media content being presented. An Internet search may be a positive indicator of engagement if the topic searched is related to the presented media content. A user quickly responding to a received text message is an example of a neutral indicator because it does not necessarily indicate a lack of engagement with the presented media content. In some implementations, the second electronic device is able to detect user movement. If a user is constantly making small movements or otherwise fidgeting, this may be a negative indicator of engagement.

In accordance with some implementations, the server system associates the received mobile device usage information with the determined media content. In some implementations, the server system matches the log of user actions against a record of the presented media content. For example, the server system determines that an episode of the television show "Mad Men" was displayed along with 6 30 second commercials over the period of one hour. The server system then matches specific user actions to the content that was being displayed at the time that the action was taken by the user.

In some implementations the server system estimates a user's engagement with particular pieces of media content based on the mobile device usage information. In some implementations the server system is able to estimate user engagement with a specific scene or character in media content. The server system then analyzes the associated received mobile device usage information and the determined media content. Based on this analysis the server system estimates the engagement of the user with the currently presented media content. For example, when a first car commercial starts the mobile device action log shows that the user turned on the user's associated mobile device and begins to check sports scores, the server system would determine the user has a low level of engagement with the commercial. Then an insurance commercial comes on and the mobile device action log shows that user put the device into sleep mode and takes no further actions for the duration of the commercial. The server system would then determine that the user has at least some engagement with the displayed advertisement.

In some implementations the level of engagement is displayed as a number between 0 and 1, with 0 indicating no engagement at all and 1 indicating full or total engagement. In other implementations the level of engagement is selected from a number of discreet options such as no engagement, low engagement, average engagement, high engagement, and total engagement.

In some implementations the server system uses the log of user actions in the associated received mobile device usage information and the determined media content to generate a user interest profile. The estimated user engagement is also used to generate and update user interest profiles. In some implementations the user interest profiles include topics of particular interest to the user associated with the user interest profile. The server system can then use this user interest profile to determine media content to recommend to the user.

In some implementations, one electronic device both determines media content being displayed in the vicinity of the electronic device and collects mobile device usage information. In some implementations the electronic device is a mobile device such as a smart phone or a tablet computer. The mobile device transmits information identifying the determined media content and the collected mobile device usage information to the server system. The server system is located remotely from the mobile device. In some implementations the mobile device itself is presenting the media content and thus has access to both information identifying the specific media content and the mobile device usage information. In other implementations the mobile device uses an integrated microphone to sample audio data in the vicinity of the smart phone and determine the media content currently being presented in the area.

In some implementations, the server system aggregates data from a plurality of users and associates the users' mobile device usage information with specific media content. By aggregating the mobile device usage information (and thereby user engagement) the server system is able to determine how engaging to a large demographic group a particular piece of media data is, on average. In some implementations the aggregated data is first stripped on any personally identifiable information Personal identifiable information includes names, street address, email addresses, social security information, or any other information that could be used to tie data in the aggregated data to a specific individual. In some implementations the aggregated data retains demographic information for use in analysis.

In some implementations the aggregated data is analyzed to determine whether a specific advertisement, show, scene, or character is engaging to users. This information can then be shared with content creators and used to create more engaging media.

FIG. 1 is a block diagram illustrating a client-server environment 100, in accordance with some implementations. The client-server environment 100 includes a client environment 108 and a server system 120 connected by network 110. In some implementations, the client environment 108-1 include a first electronic device 102-1 that includes a display 104-1 and a second electronic device 106-1 that includes a microphone 118-1. In some implementations, the client environment 108-2 includes a display 104-2 and a second electronic device 106-2 with a microphone 118-2. The server system 120 includes a data reception module 122, an association module 124, an estimation module 126, and a media information database 130. The network 110 may be any of a variety of networks, including local area networks (LAN), wide area networks (WAN), wireless networks, wired networks, the Internet, or a combination of such networks.

In accordance with some implementations, the client environment 108-1 includes a first electronic device 102-1. The first electronic device 102-1 includes a display 104-1 capable of presenting media content. In some implementations the first electronic device is any type of electronic device capable of displaying media content, such as a set-top box, a DVR, a personal computer with a display, or a laptop. The client environment 108-1 includes a second electronic device 106-1. In some implementations the second electronic device 106-1 includes a microphone 118-1. The microphone is used to record audio input from the vicinity surrounding the second electronic device 106-1. In some implementations the second electronic device 106-1 is a mobile device such as a smart phone or a tablet computer. The second electronic device 106 is typically one that a user will have access to while simultaneously being exposed to media content. The user then can focus either on the second electronic device 106-1 or the media presented on the display 104-1.

In some implementations, the client environment 108-2 includes a display 104-2, without an associated electronic device with networking capability, and a second electronic device 106-2 with a microphone 118-2. In this case the second electronic device 106-2 must send information concerning the media displayed on the display 104-2 to the server because the display 104-2 does not have the capability to connect to the server system 120.

In accordance with some implementations, the electronic devices 102 transmit media content identification information 112 to the server system 120. In some embodiments the media content identification information 112 includes media content identification numbers that identify specific pieces of media content. In other embodiments the content identification information 112 includes location information, channel information, and time information. The server system 120 uses this information to determine the specific piece of media content being presented on the display 104. In yet other implementations, the content identification information 112 includes an audio fingerprint, an audio watermark, or a snippet of audio content.

In accordance with some implementations, the electronic devices 106 transmit mobile device usage information 116 to the server system 120. In some embodiments the mobile device usage information 116 includes a log of actions performed by the user on a respective second device 106. Actions recorded in the log of actions include but are not limited to opening an application, closing an application, turning on the device, turning off the device, search requests, and specific actions within applications. For example, the mobile device usage information indicates that the user opened up a web browser and visited a website. The user then executed an Internet search, clicked on one of the results and then powered down the device.

In some implementations the mobile device usage information 116 is sent to the server by a second electronic device 106-2 that is a mobile device and the media content identification information 112 is sent to the server by the same second electronic device 106-2. In other implementations the second electronic device 106-2 is a mobile device and transmits both the mobile device usage information 116 and the media content identification information 112 to the server system 120. In some implementations the mobile device gets media content identification information 112 by obtaining audio input from the microphone 118-2.

In some implementations the server system 120 includes a data reception module 122, an association module 124, an estimation module 126, a user engagement database 128, and a media information database 130.

In some implementations the data reception module 122 receives data from an electronic device 102 located remotely from the server system 120 over the network 110. In some implementations the data reception module 122 receives the media content identification information 112 and mobile device usage information 116 from an electronic device;

In some implementations the association module 124 receives media content identification information 112 and mobile device usage information 116 from the data reception module 122. The association module 124 accesses the media information database 130 using the media content identification information 112 to determine the specific media content matching the media content identification information 112. In some implementations the association module 124 also retrieves additional information about the determined specific media content. The association module 124 associates the determined specific content with the mobile device usage information 116. For example, if the association module 124 determined the user viewed 15 minutes of "The Daily Show" and 3 commercials over a 17 minute period, it would associate the specific actions in the mobile device usage information 116 with the media content presented when the action took place.

In some implementations the estimation module uses the association data generated by the association module 124 to estimate user engagement with the specific content being presented. The estimation module determines, for each specific action associated with a specific piece of media content, whether the action indicates high engagement, low engagement, or neutral engagement (i.e., does not indicate either way). For example, if during a commercial a user executes a web search for the company being advertised, this action would be determined to indicate high engagement. Conversely, if the user starts up a crossword application during a television program, this action would be determined to indicate low engagement with that media content. The estimation module determines, based on all the actions recorded during a given piece of media content an estimated level of engagement. The estimated level of engagement can be represented as a number between 0 and 1 where 0 is no engagement at all and 1 is full engagement. In some implementations, the level of engagement is selected from a number of discreet options such as no engagement, low engagement, average engagement, high engagement, and total engagement. In some implementations, engagement data can be estimated for a portion of television program, such as for a particular scene, theme, or character.

In some implementations the user engagement database 128 stores the data generated by the server system 120 regarding user engagement with media content. In some implementations, the user engagement database 128 tracks a user's historical engagement with media content over time to build a user interest profile. The user interest profile keeps track of, for a specific user, the content (and advertisements) the user finds engaging or that the user dislikes. This user interest profile is then used to recommend future media to a user or to help target advertisements at users based on their interests.

In some implementations the user engagement database 128 receives association information from the association module 124 and user engagement information from the estimation module 126 for a plurality of users. The user engagement database 128 then removes any personally identifiable information from the information (such as names, addresses, social security numbers). Once the personal identifiable information is removed, the user engagement database 126 aggregates the association data from a large number of users. This aggregated information is then analyzed to determine general user engagement with particular shows, advertisements, genres, characters, and media sources. This information is useful for media creators to help them create more engaging media and for advertisements to help them determine the value of particular advertisements. In some implementations, user engagement can be studied based on general demographic factors (but not personally identifiable information.) For example, the data is analyzed to determine the average engagement with an advertisement for a video game with the advertisement intended audience, boys 13-25. The user engagement database 128 can then determine the average (or median) value for just that demographic group.

In some implementations the media information database 130 stores information related to media content. In some implementations the media information database 130 stores information to identify specific media content based on the media content identification information 112. The media information database 130 also stores additional information about media content. The additional information includes metadata about the specific media content. The metadata includes media content ID that identifies a particular piece of media content, the set of corresponding broadcast times (a set of times, each time corresponding to one period during which the media is scheduled to be broadcast), a category list for classifying the media content, channel information, a media description outlining the content of the media content, cast information, and genre information.

Figure 2:
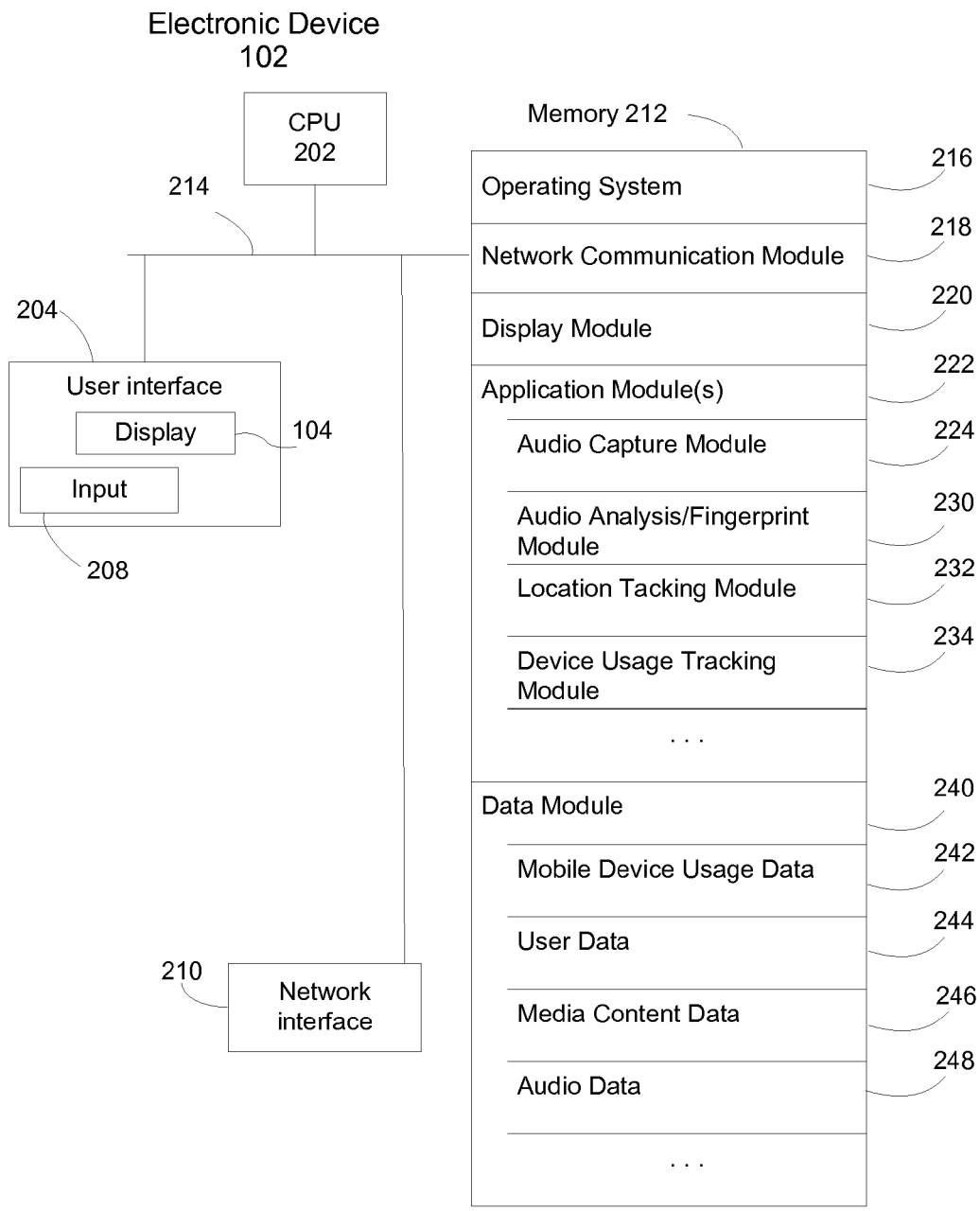
FIG. 2 is a block diagram illustrating a client system in accordance with some implementations.

FIG. 2 is a block diagram illustrating a client system 102, in accordance with some implementations. The electronic device 102 typically includes one or more processing units (CPU's) 202, one or more network interfaces 210, memory 212, and one or more communication buses 214 for interconnecting these components. The electronic device 102 includes a user interface 204. The user interface 204 includes an associated display device 104 and optionally includes an input means such as a keyboard, a microphone, mouse, a touch sensitive display, or other input buttons 208. Optionally, the display device 104 includes an audio device or other information delivery device. Furthermore, some client systems use a microphone and voice recognition to supplement or replace the keyboard.

Memory 212 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 212 may optionally include one or more storage devices remotely located from the CPU(s) 202. Memory 212, or alternately the non-volatile memory device(s) within memory 212, includes a non-transitory computer readable storage medium. In some implementations, memory 212 or the computer readable storage medium of memory 212 stores the following programs, modules and data structures, or a subset thereof:

- an operating system 216 that includes procedures for handling various basic system services and for performing hardware dependent tasks;
- a network communication module 218 that is used for connecting the client system 102 to other computers via the one or more communication network interfaces 210 (wired or wireless) and one or more communication networks, such as the Internet, other wide area networks, local area networks, metropolitan area networks, and so on;
- a display module 220 for enabling display of media on a display 104 associated with the client system 102;
- one or more client system 102 applications module(s) 222 for enabling the client system 102 to perform the functions offered by the client system 102, including but not limited to:
  - an audio capture module 224 for using the associated microphone (FIG. 1, 118) to capture audio data of the media content being presented in the vicinity of the electronic device 102;
  - an audio analysis/fingerprint module 230 for analyzing the audio data captured by the microphone (FIG. 1, 118) to determine audio fingerprints, audio watermarks, or identifiable snippets of audio for transmission to the server system;
  - a location tracking module 232 for determining whether the electronic device 102 is in the vicinity of a display presenting media content; and
  - a device usage tracking module for tracking an recording the actions taken by a user on the electronic device and the time at which action occurs;
- a data module 240 for storing data related to the client system 102, including but not limited to:
  - mobile device usage data 242 including a log of actions performed by the user on the second device and the time at which each action occurred, wherein actions recorded in the log of actions include but are not limited to opening an application, closing an application, turning on the device, turning off the device, search requests, and specific actions within applications;
  - user data 244 including information concerning users of the client system 102 such as a user profile, user preferences and interests, and other information relevant to effectively providing services to the user;
  - media content data 246 including data associated with and necessary to display the media that is currently displayed or will be soon be displayed on the display 104 associated with the electronic device 246; and
  - audio data 248 including data gathered by the microphone (FIG. 1, 118) associated with the electronic device 102, wherein the audio data is audio recorded from the vicinity of the electronic device 102.

Figure 3:
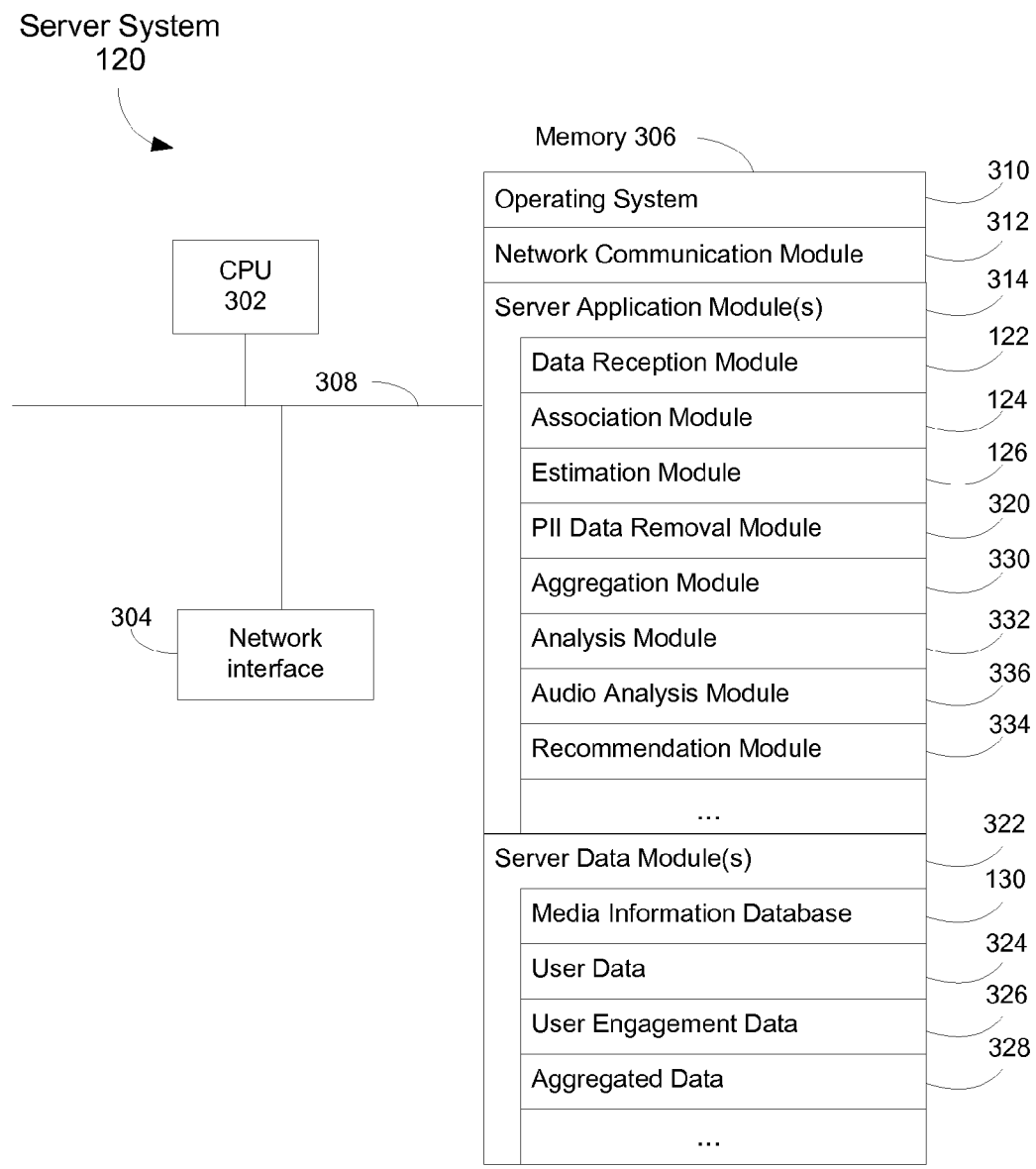
FIG. 3 is a block diagram illustrating a server system in accordance with some implementations.

FIG. 3 is a block diagram illustrating a server system 120, in accordance with some implementations. The server system 120 typically includes one or more processing units (CPU's) 302, one or more network interfaces 304, memory 306, and one or more communication buses 308 for interconnecting these components.

Memory 306 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 306 may optionally include one or more storage devices remotely located from the CPU(s) 302. Memory 306, or alternately the non-volatile memory device(s) within memory 306, includes a non-transitory computer readable storage medium. In some implementations, memory 306 or the computer readable storage medium of memory 306 stores the following programs, modules and data structures, or a subset thereof:

- an operating system 310 that includes procedures for handling various basic system services and for performing hardware dependent tasks;
- a network communication module 312 that is used for connecting the server system 120 to other computers via the one or more communication network interfaces 304 (wired or wireless) and one or more communication networks, such as the Internet, other wide area networks, local area networks, metropolitan area networks, and so on;
- one or more server application module(s) 314 for enabling the server system 120 to perform the functions offered by the server system 120, including but not limited to:
  - a data reception module 122 for receiving data from a plurality of electronic devices; the data received including media content identification information 112 and mobile device usage information 116;
  - a data association module 124 for receiving media content identification information 112 and mobile device usage information 116 from the data reception module 122, accessing the media information database 130 using the media content identification information 112 to determine the specific media content matching the media content identification information, retrieving additional information about the determined specific media content, and associating the determined specific content with the mobile device usage information 116;
  - an estimation module 126 for using the association data generated by the association module 124 to estimate user engagement with the specific content being presented;
  - a PII (persona identifiable information) removal module 320 for removing persona identifiable information from the associated data generated by the association module and from the estimation data generated by the estimation module to generate anonymous user engagement data;
  - an aggregation module 330 for aggregating the anonymous user engagement data generated by the PII (persona identifiable information) removal module 320 for a plurality of user;
  - an audio analysis module 336 for analyzing the audio data received from a second electronic device captured by the microphone (FIG. 1, 118) to determine the specific media content presented in the vicinity of the electronic device (FIG. 2, 102); wherein the audio analysis module 336 identifies specific media content by analyzing audio fingerprints, audio watermarks, or identifiable snippets of audio; and
  - an analysis module 332 for analyzing the aggregated anonymous user engagement data to determine average level of user interest for particular pieces of media content; wherein the analysis includes generic demographic factors; and
- one or more server data module(s) 322 for storing data related to the server system 120, including but not limited to:
  - media information database 130 including specific details about particular pieces of media, including, for example, the genre information, cast information, director information, event information, and other information related to specific media;
  - user data 324 including information concerning users of the electronic devices (FIG. 1, 102) such as a user profile, user preferences and interests, and other information relevant to effectively providing services to the user;
  - user engagement data 326 including data representing user engagement with particular pieces of media content; and
  - aggregated data 328 including aggregated associated data and engagement data for a plurality of users.

Figure 4:
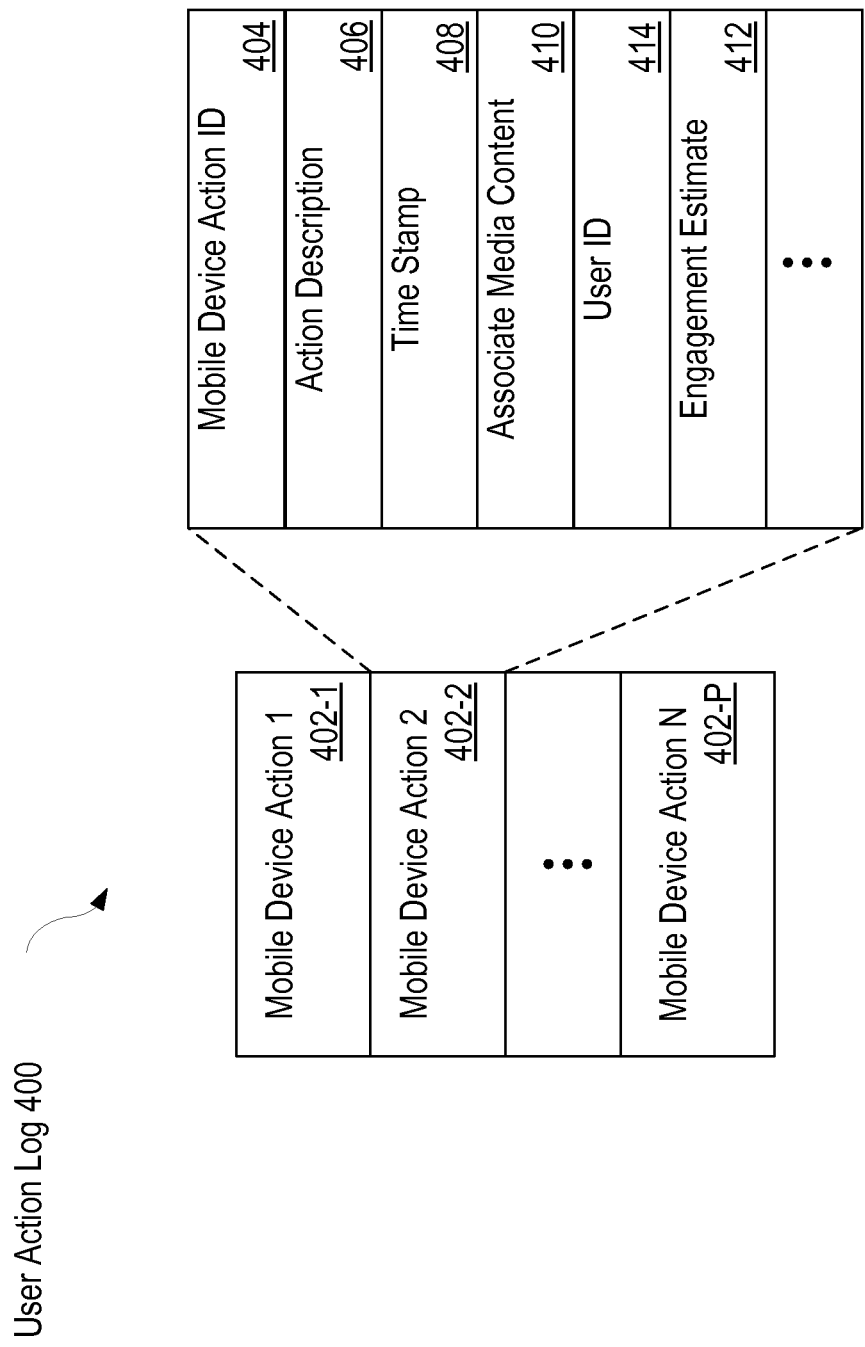
FIG. 4 depicts a block diagram of an example data structure for the user action log for storing mobile device user actions in accordance with some implementations.

FIG. 4 depicts a block diagram of an example data structure for the user action log for storing mobile device user actions in accordance with some implementations. In accordance with some implementations, the user action log includes a plurality of mobile device action records 402-1 to 402-P, each of which corresponds to a user action on a mobile device. In some implementations, each mobile device action record 402 contains a mobile device action ID 404 that identifies a particular user action, a description of the action 406, a time stamp 408, the specific media content 410 with which the action is associated, the user id for the user with whom this action is associated 414, and estimated engagement 412 of the user with the media content based on the action described by this record 402.

In some implementations, the mobile device action ID is a unique identifier assigned to this action record to allow it to be referenced, retrieved, and stored. In some implementations the action description 406 includes information describing the action. For example, the description could include a description of the type of action, such as a text message, email, application use, Internet search, Internet browsing, turning on or off the device. The description would then also include more specific details concerning the action such as, for an Internet search, the text of the search and what results the user ultimately selected. In another example the action description 406 includes information describing the specific application that was opened and how it was used or the specific website browsed by the user. This information is then used to estimate engagement. The time stamp 408 includes time/date information that identifies when the action was taken by the user.

In some implementations, the associated media content 410 includes information identifying the specific media content that was presented when the user act was recorded. For example, if a toothpaste commercial was presented while the user played a game on a tablet computer, a unique identifier for the specific commercial is stored in the associated media content 410 portion of the mobile device action record 402.

In accordance with some implementations, the user ID 414 includes information identifying a specific user profile associated with the user of the electronic device. In some implementations the engagement estimate 412 includes an estimate representing the user's engagement with the associated media content 410.

Figure 5:
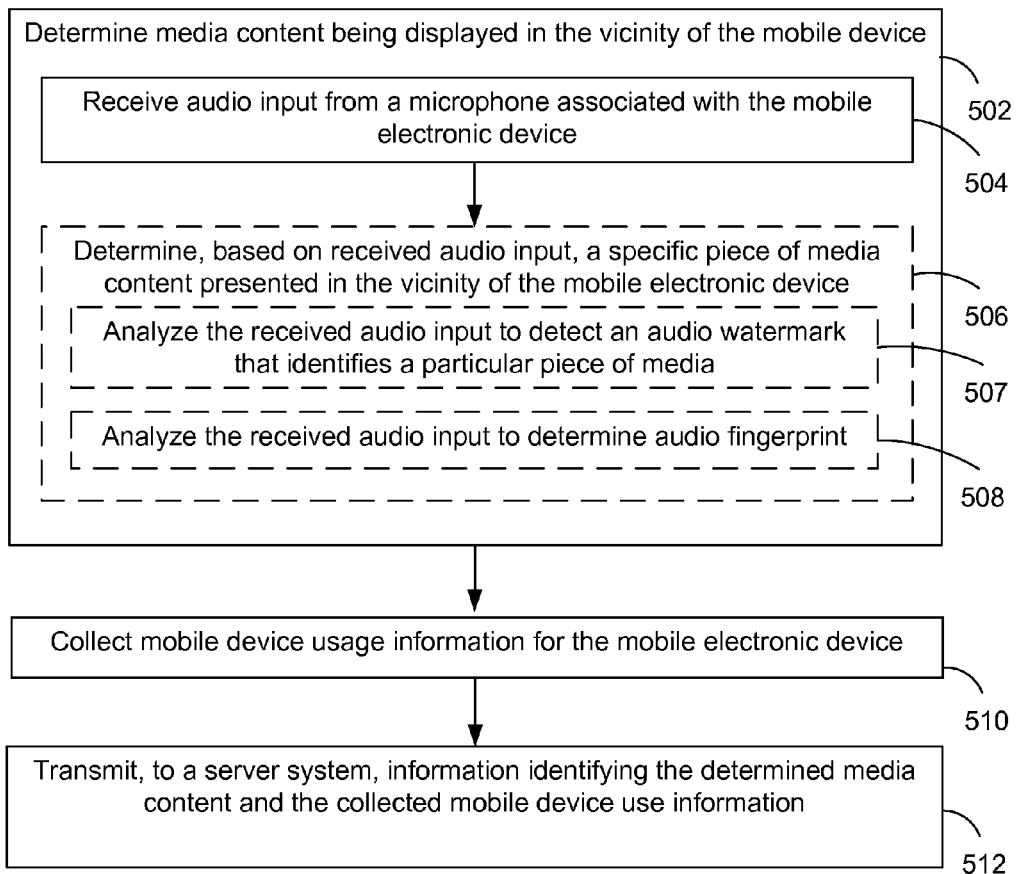
FIG. 5 is a flow diagram illustrating the process of determining viewer interest in accordance with some implementations.

FIG. 5 is a flow diagram illustrating the process of determining viewer interest in accordance with some implementations. Each of the operations shown in FIG. 5 may correspond to instructions stored in a computer memory or computer readable storage medium. Optional operations are indicated by dashed lines (e.g., boxes with dashed-line borders). In some implementations, the method described in FIG. 5 is performed by the server system (FIG. 1, 120).

In some implementations the mobile electronic device (FIG. 2, 102) determines media content being displayed in the vicinity of the mobile device (502). In some implementations the mobile electronic device (FIG. 2, 102) determines specific media content in many situations. For example, content playing at on the TV in one's home, on the radio in the car, in the movie theater, etc. In some implementations the electronic device determines the specific media being presented by receiving audio input from a microphone associated with the mobile electronic device (FIG. 2, 102) (504).

In some implementations the mobile electronic device (FIG. 1, 102) determines, based on the received audio input, a specific piece of media content presented in the vicinity of the mobile electronic device (506). In some implementations this is accomplished by analyzing the received audio input to detect an audio watermark that identifies a particular piece of media (507). In some implementations the mobile device (FIG. 1, 102) analyzes the received audio input to determine audio fingerprint (508). Either audio watermarks or audio fingerprints can be determined from brief video or audio snippets of the presented media content.

In some implementations the mobile electronic device (FIG. 1, 102) collects mobile device usage information for the mobile electronic device (510). The content and use of mobile device usage information is described more thoroughly above. In some implementations the mobile electronic device (FIG. 1, 102) transmits information identifying the determined media content and the collected mobile device use information to a server system (FIG. 1, 120) for analysis (512).

Figure 6:
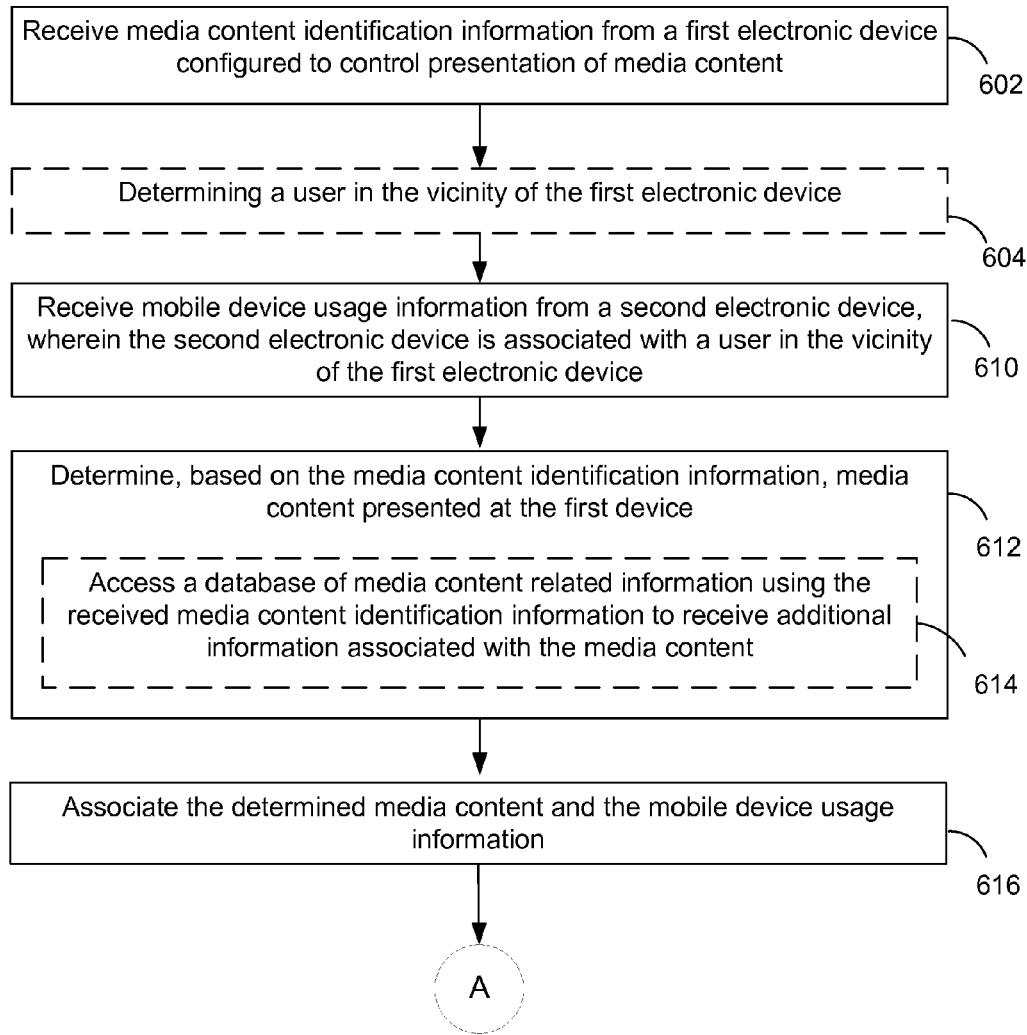
FIG. 6 is a flow diagram illustrating the process of determining viewer interest in accordance with some implementations.

FIG. 6 is a flow diagram illustrating the process of determining viewer interest in accordance with some implementations. Each of the operations shown in FIG. 6 may correspond to instructions stored in a computer memory or computer readable storage medium. Optional operations are indicated by dashed lines (e.g., boxes with dashed-line borders). In some implementations, the method described in FIG. 6 is performed by the server system (FIG. 1, 120).

In accordance with some implementations, the server system (FIG. 1, 120) receives media content identification information from a first electronic device (FIG. 2, 102) configured to control presentation of media content (602). For example, the first electronic device (FIG. 2, 102) is an Internet enabled television and sends the channel currently selected by a user, the time, and the location of the television (or in some cases the name of the cable provider) such as ("Channel 5," "9 pm PDT," "San Mateo California").

In some implementations, the server system (FIG. 1, 120) then determines a user in the vicinity of the first electronic device (FIG. 2, 102) (604). The server system can determine this in a number of ways. In some implementations a first electronic device (FIG. 2, 102), such as set top box, is linked with/paired with a particular second electronic device (FIG. 1, 106), such as a user's smart phone. In some implementations the server system (FIG. 1, 120) is able to use the GPS function of a mobile device to determine whether any users are in the vicinity of a particular first electronic device (FIG. 2, 102). In some implementations the server system (FIG. 1, 120) associates information from more than one device based the user account logged onto the device. However the server system must still determine that both devices are in the same vicinity in order to use the received data to estimate engagement or update a personal user profile.

In some implementations the server system (FIG. 1, 120) receives mobile device usage information from a second electronic device (610). The second electronic device (FIG. 1, 106) is associated with a user in the vicinity of the first electronic device. In some implementations the second electronic device (FIG. 1, 106) is a mobile device currently carried by a user. In some implementations, the mobile device usage information includes a log of actions performed by the user on the second device. Actions recorded in the log of actions include but are not limited to: opening an application, closing an application, turning on the device, turning off the device, search requests, and specific actions within applications. For example, the mobile device usage information indicates that the user turned the device on at a certain time, opened up a game, and then played the game for 12 minutes until no more input is detected and the mobile device goes into sleep mode. Each action recorded in the log can be classified as a positive indicator of engagement, a negative indicator of engagement, or a neutral indicator of engagement. For example, a mobile game is almost always a negative indicator because it requires the focus of the user and is unlikely to be related to media content being presented. An Internet search may be a positive indicator of engagement if the topic searched is related to the presented media content. A user quickly responding to a received text message is an example of a neutral indicator because it does not necessarily indicate a lack of engagement with the presented media content.

In some implementations the server system (FIG. 1, 120) determines, based on the media content identification information, the specific media content presented at the first electronic device (FIG. 2, 102) (612). For example, the server receives information indicating that the television was tuned to channel seven at 9 pm PDT in Palo Alto, Calif. on May 12, 2012. Based on this information the server system (FIG. 1, 120) the server system determines that the presented media is an episode of "The Simpsons." The server can further determine the specific commercials presented during that interval of time. In some implementations the server system (FIG. 1, 120) accesses a database of media content related information to determine additional information associated with the media content (614).

In some implementations the server system (FIG. 1, 120) associates the determined media content and the mobile device usage information (616). Associating includes, for each stored user action, determining the specific piece of media content presented when that action occurred. In this way the server matches every user action on a mobile device to a specific piece of media content.

Figure 7:
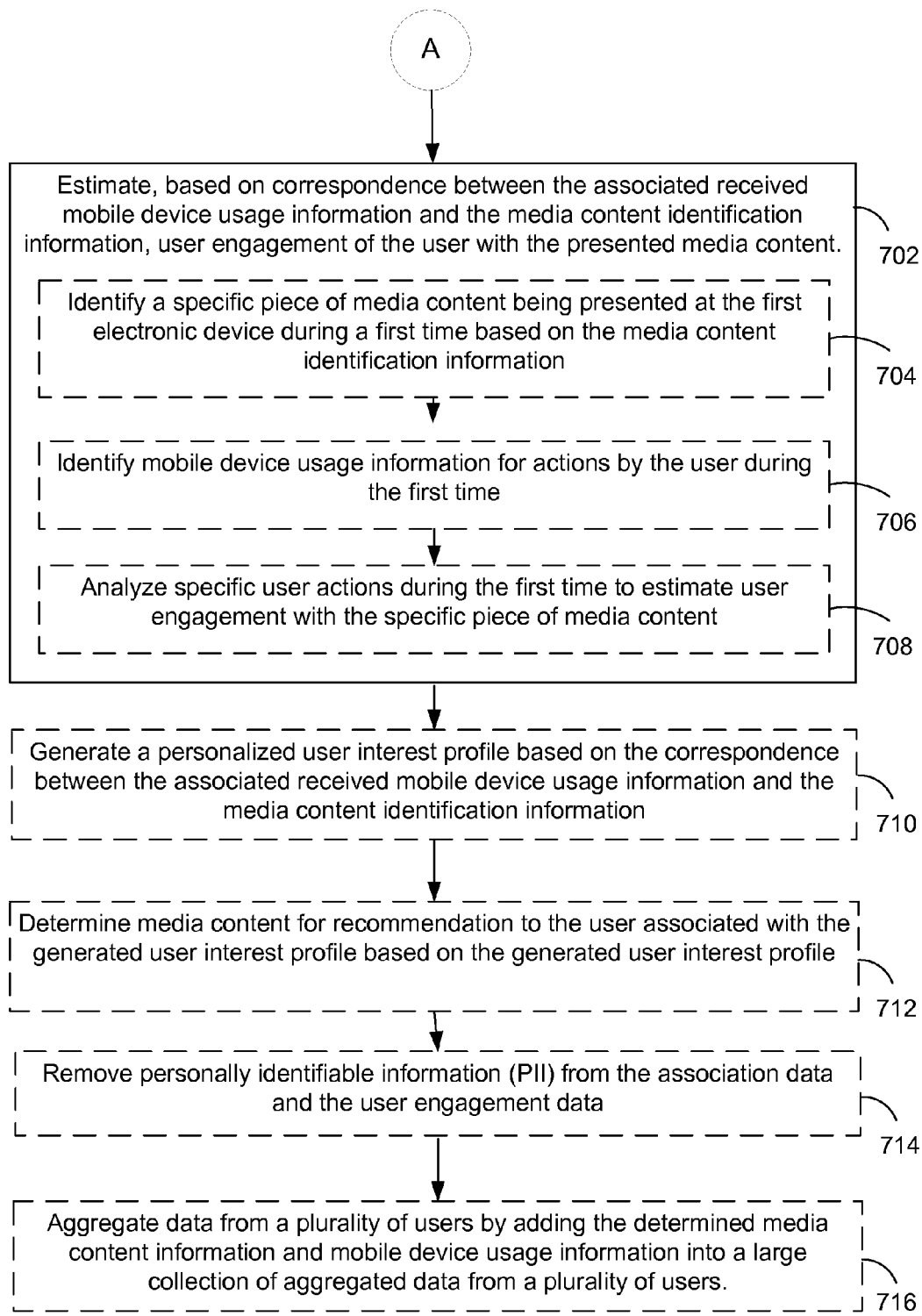
FIG. 7 is a flow diagram illustrating the process of determining viewer interest in accordance with some implementations.

FIG. 7 is a flow diagram illustrating the process of determining viewer interest in accordance with some implementations. Each of the operations shown in FIG. 7 may correspond to instructions stored in a computer memory or computer readable storage medium. Optional operations are indicated by dashed lines (e.g., boxes with dashed-line borders). In some implementations, the method described in FIG. 7 is performed by the server system (FIG. 1, 120).

In some implementations the server system (FIG. 1, 120) estimates, based on correspondence between the associated received mobile device usage information and the media content identification information, user engagement of the user with the presented media content (702). In some implementations the server system (FIG. 1, 120) identifies a specific piece of media content being presented at the first electronic device during a first time based on the media content identification information (704). In some implementations the server system (FIG. 1, 120) then identifies specific mobile device usage information for actions by the user during the first time (706). In some implementations the server system (FIG. 1, 120) identifies any action that starts or stops within the first time or continues throughout the first time as associated with the specific piece of media content. The server system then analyzes each specific user action that occurred during the first time to estimate user engagement with the specific piece of media content. Actions that indicate high engagement (searching for topics discussed in media or for products advertised) will result in a higher estimated engagement level, while actions that indicate low engagement (game playing, unrelated web surfing) will result in a lower estimated user engagement. Actions that have are neutral (like quickly answering a text message or call) do not affect the estimated user engagement. For example, if a user is viewing a commercial for car batteries and begins to play checkers on his or her phone, the estimated user engagement with the car battery commercial will be low.

In some implementations the server system (FIG. 1, 120) generates a personalized user interest profile based on the correspondence between the associated received mobile device usage information and the media content identification information. For example, if a user has consistently higher engagement with football games than with soccer matches, the profile would reflect that the user likely has higher interest in football.

In some implementations the server system (FIG. 1, 120) determines media content for recommendation to the user associated with the generated user interest profile based on the generated user interest profile. For example, based on the user interests recorded in the user profile, the server system could recommend content to view during the commercial breaks of a football game. In other implementations, the server system (FIG. 1, 120) uses the user interest profile to selected relevant advertisements for display to a user.

In some implementations the server system (FIG. 1, 120) removes personally identifiable information (PII) from the association data and the user engagement data (714). This allows the system to analyze the data in aggregate, without being able to specifically track a single user. Data can then be gathered for different demographic groups.

In some implementations the server system (FIG. 1, 120) aggregate data from a plurality of users by adding the determined media content information and mobile device usage information into a large collection of aggregated data from a plurality of users (716).

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present implementations. The first contact and the second contact are both contacts, but they are not the same contact.

The terminology used in the description of the implementations herein is for the purpose of describing particular implementations only and is not intended to be limiting. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if (a stated condition or event) is detected" may be construed to mean "upon determining" or "in response to determining" or "upon detecting (the stated condition or event)" or "in response to detecting (the stated condition or event)," depending on the context.

What is claimed is:

1. A method for determining user engagement with media content, comprising:
    on a server system having one or more processors and memory storing data and one or more programs for execution by the one or more processors:
        receiving, from a first electronic device configured to control presentation of media content, media content identification information for media content presented during a particular time period;
        receiving mobile device usage information from a second electronic device in proximity to the first electronic device, the second electronic device associated with a particular user and the mobile device usage information corresponding to mobile device usage of the particular user during the particular time period;
        based on the mobile device usage information and the media content identification information, determining a level of engagement of the particular user with the presented media content; and
        in accordance with a determination that the level of engagement of the particular user meets one or more predefined criterion, recommending additional media content to the user and targeting advertisements at the particular user based on the presented media content.

2. The method of claim 1, further comprising determining, based on the media content identification information, the media content being presented, wherein the presented media content includes television programs and advertisements.

3. The method of claim 2, wherein determining the media content includes:
    accessing a database of media content related information using the received media content identification information to obtain additional information associated with the presented media content; and
    determining the media content based at least in part on the additional information.

4. The method of claim 1, further comprising generating a personalized user interest profile for the particular user based on the mobile device usage information and the media content identification information.

5. The method of claim 1, wherein the media content identification information includes channel information, location information, and time information.

6. The method of claim 1, wherein the received media content information identifies specific media content currently presented at the first electronic device.

7. The method of claim 1, further comprising determining that the particular user was in proximity to the first electronic device during the particular time period based on information received from the second electronic device.

8. The method of claim 1, wherein the mobile device use information includes information on what applications are used by the particular user of the mobile device, when the applications are used, and how the applications are used.

9. The method of claim 1, wherein the mobile device usage information includes a log of actions performed by the particular user on the second device.

10. The method of claim 9, wherein specific user actions included in the log of actions include opening an application, closing an application, turning on the device, turning off the device, search requests, and specific actions within applications.

11. The method of claim 1, wherein the mobile device usage information includes information about specific user actions during the particular time period.

12. A server system for determining user engagement with media content, comprising:
one or more processors;
memory storing one or more programs to be executed by the one or more processors;
the one or more programs comprising instructions for:
receiving, from a first electronic device configured to control presentation of media content, media content identification information for media content presented during a particular time period;
receiving mobile device usage information from a second electronic device in proximity to the first electronic device, the second electronic device associated with a particular user and the mobile device usage information corresponding to mobile device usage of the particular user during the particular time period;
based on the mobile device usage information and the media content identification information, determining a level of engagement of the particular user with the presented media content; and
in accordance with a determination that the level of engagement of the particular user meets one or more predefined criterion, recommending additional media content to the user and targeting advertisements at the particular user based on the presented media content.

13. The system of claim 12, wherein the one or more programs further comprise instructions for determining, based on the media content identification information, the media content being presented, wherein the presented media content includes television programs and advertisements.

14. The system of claim 12, wherein the one or more programs further comprise instructions for generating a personalized user interest profile for the particular user based on the mobile device usage information and the media content identification information.

15. The system of claim 12, wherein the mobile device use information includes information on what applications are used by the particular user of the mobile device, when the applications are used, and how the applications are used.

16. The system of claim 12, wherein the mobile device usage information includes a log of actions performed by the particular user on the second device.

17. A non-transitory computer-readable storage medium storing one or more programs configured for execution by a server system, the one or more programs comprising instructions for:
receiving, from a first electronic device configured to control presentation of media content, media content identification information for media content presented during a particular time period;
receiving mobile device usage information from a second electronic device in proximity to the first electronic device, the second electronic device associated with a particular user and the mobile device usage information corresponding to mobile device usage of the particular user during the particular time period;
based on the mobile device usage information and the media content identification information, determining a level of engagement of the particular user with the presented media content; and
in accordance with a determination that the level of engagement of the particular user meets one or more predefined criterion, recommending additional media content to the user and targeting advertisements at the particular user based on the presented media content.

18. The storage medium of claim 17, wherein the one or more programs further comprise instructions for determining, based on the media content identification information, the media content being presented, wherein the presented media content includes television programs and advertisements.

19. The storage medium of claim 17, wherein the one or more programs further comprise instructions for generating a personalized user interest profile for the particular user based on the mobile device usage information and the media content identification information.

20. The storage medium of claim 17, wherein the mobile device use information includes information on what applications are used by the particular user of the mobile device, when the applications are used, and how the applications are used.

* * * * *